United States Patent
Kaleko et al.

(10) Patent No.: US 10,991,060 B2
(45) Date of Patent: Apr. 27, 2021

(54) DEVICE, SYSTEM AND METHOD FOR DISPATCHING RESPONDERS TO PATROL ROUTES

(71) Applicant: MOTOROLA SOLUTIONS, INC., Chicago, IL (US)

(72) Inventors: David Kaleko, Oak Park, IL (US); Jehan Wickramasuriya, Saint Charles, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 173 days.

(21) Appl. No.: 16/355,321

(22) Filed: Mar. 15, 2019

(65) Prior Publication Data
US 2020/0294169 A1    Sep. 17, 2020

(51) Int. Cl.
| | |
|---|---|
| *G06Q 50/26* | (2012.01) |
| *G06Q 10/06* | (2012.01) |
| *G06N 3/08* | (2006.01) |
| *G06N 20/00* | (2019.01) |

(52) U.S. Cl.
CPC ..... *G06Q 50/26* (2013.01); *G06Q 10/063116* (2013.01); *G06N 3/08* (2013.01); *G06N 20/00* (2019.01)

(58) Field of Classification Search
CPC .......................................... G06Q 10/00–50/00
USPC ................................................. 705/7.11–7.42
See application file for complete search history.

(56) References Cited

U.S. PATENT DOCUMENTS

| | | | | |
|---|---|---|---|---|
| 6,408,304 B1* | 6/2002 | Kumhyr | .................. | G06Q 10/10 |
| 8,229,658 B1* | 7/2012 | Dabell | ................. | G08G 1/0129 |
| | | | | 701/117 |
| 8,924,332 B2* | 12/2014 | Maciejewski | ........... | G06F 17/18 |
| | | | | 706/46 |
| 8,949,164 B1* | 2/2015 | Mohler | .................... | G06N 5/02 |
| | | | | 706/46 |
| 9,129,219 B1* | 9/2015 | Robertson | .............. | G06N 5/048 |
| 9,329,597 B2* | 5/2016 | Stoschek | ................ | G05D 1/021 |

(Continued)

OTHER PUBLICATIONS

Wikipedia—Machine Learning [as retrieved from https://web.archive.org/web/20181230211823/https://en.wikipedia.org/wiki/Machine_learning] (Year: 2018).*

(Continued)

*Primary Examiner* — Alan S Miller
(74) *Attorney, Agent, or Firm* — Perry + Currier, Inc.

(57) ABSTRACT

A device, system and method for dispatching responders to patrol routes is provided. A device accesses: historical patrol route information indicating patrol routes taken for each of a plurality of time periods, each of the patrol routes taken by a respective uniquely identified responder; and historical crime information indicating actual crime rates for the patrol routes taken. The device receives a request to assign responders to respective patrol routes and responsively: determines available responders for the upcoming time period; determines, based on the available responders and the historical crime information, a mapping of the available responders to the respective patrol routes that reduces and/or minimizes an expected crime rate for the upcoming time period across the respective patrol routes; and based on the mapping, causes the available responders to be dispatched to the respective patrol routes for the upcoming time period.

18 Claims, 5 Drawing Sheets

(56) References Cited

U.S. PATENT DOCUMENTS

| | | | | |
|---|---|---|---|---|
| 9,715,668 | B1* | 7/2017 | Brandt | G06Q 10/0631 |
| 10,546,488 | B2* | 1/2020 | Akiyama | H04B 1/3822 |
| 10,558,936 | B2* | 2/2020 | Herman | G06Q 10/06311 |
| 2009/0198641 | A1* | 8/2009 | Tortoriello | G06N 7/02 706/52 |
| 2010/0138096 | A1* | 6/2010 | Hung | G05D 1/0274 701/25 |
| 2011/0261067 | A1* | 10/2011 | Trinko | G01C 21/3461 345/589 |
| 2012/0256745 | A1* | 10/2012 | Piett | G06Q 30/02 340/540 |
| 2015/0161554 | A1* | 6/2015 | Sweeney | G06Q 10/08355 705/7.15 |
| 2015/0379413 | A1* | 12/2015 | Robertson | G06N 20/00 706/11 |
| 2016/0321563 | A1* | 11/2016 | Sinha | G06N 3/008 |
| 2017/0098181 | A1* | 4/2017 | Herman | G06N 5/003 |
| 2018/0012323 | A1* | 1/2018 | Oyenan | G06Q 50/265 |
| 2018/0059660 | A1* | 3/2018 | Heatzig | G06K 9/00664 |
| 2018/0060798 | A1* | 3/2018 | Stefik | G06Q 10/063116 |
| 2018/0082202 | A1* | 3/2018 | Vepakomma | G06N 20/00 |
| 2018/0096253 | A1* | 4/2018 | Goldstein | G06N 3/084 |
| 2020/0029054 | A1* | 1/2020 | Ellis | H04N 7/185 |

OTHER PUBLICATIONS

Reis, Danilo, et al. "Towards optimal police patrol routes with genetic algorithms." International Conference on Intelligence and Security Informatics. Springer, Berlin, Heidelberg, 2006. (Year: 2006).*

Li, Li, et al. "Police patrol service optimization based on the spatial pattern of hotspots." Proceedings of 2011 IEEE International Conference on Service Operations, Logistics and Informatics. IEEE, 2011. (Year: 2011).*

Chawathe, Sudarshan S. "Organizing hot-spot police patrol routes." 2007 IEEE Intelligence and Security Informatics. IEEE, 2007. (Year: 2007).*

Leigh, Johanna, Sarah Dunnett, and Lisa Jackson. "Predictive police patrolling to target hotspots and cover response demand." Annals of Operations Research 283.1 (2019): 395-410. (Year: 2019).*

Rosser, Gabriel, et al.: "Predictive Crime Mapping: Arbitrary Grids or Street Networks?", Published online: Sep. 9, 2016 at Springerlink. com, J Quant Criminol (2017) 33:569-594.

* cited by examiner

DEVICE, SYSTEM AND METHOD FOR DISPATCHING RESPONDERS TO PATROL ROUTES

BACKGROUND OF THE INVENTION

Dispatching responders (e.g. police officers) to patrol routes is often performed by a dispatcher. The dispatcher may use considerable processing and/or network resources in determining which responders to assign to which patrol routes, for example to access various employee records and the like. When responders are not dispatched so as to reduce overall predicted crime and/or expected crime, substantial additional processing power and communications resources must be consumed to compensate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
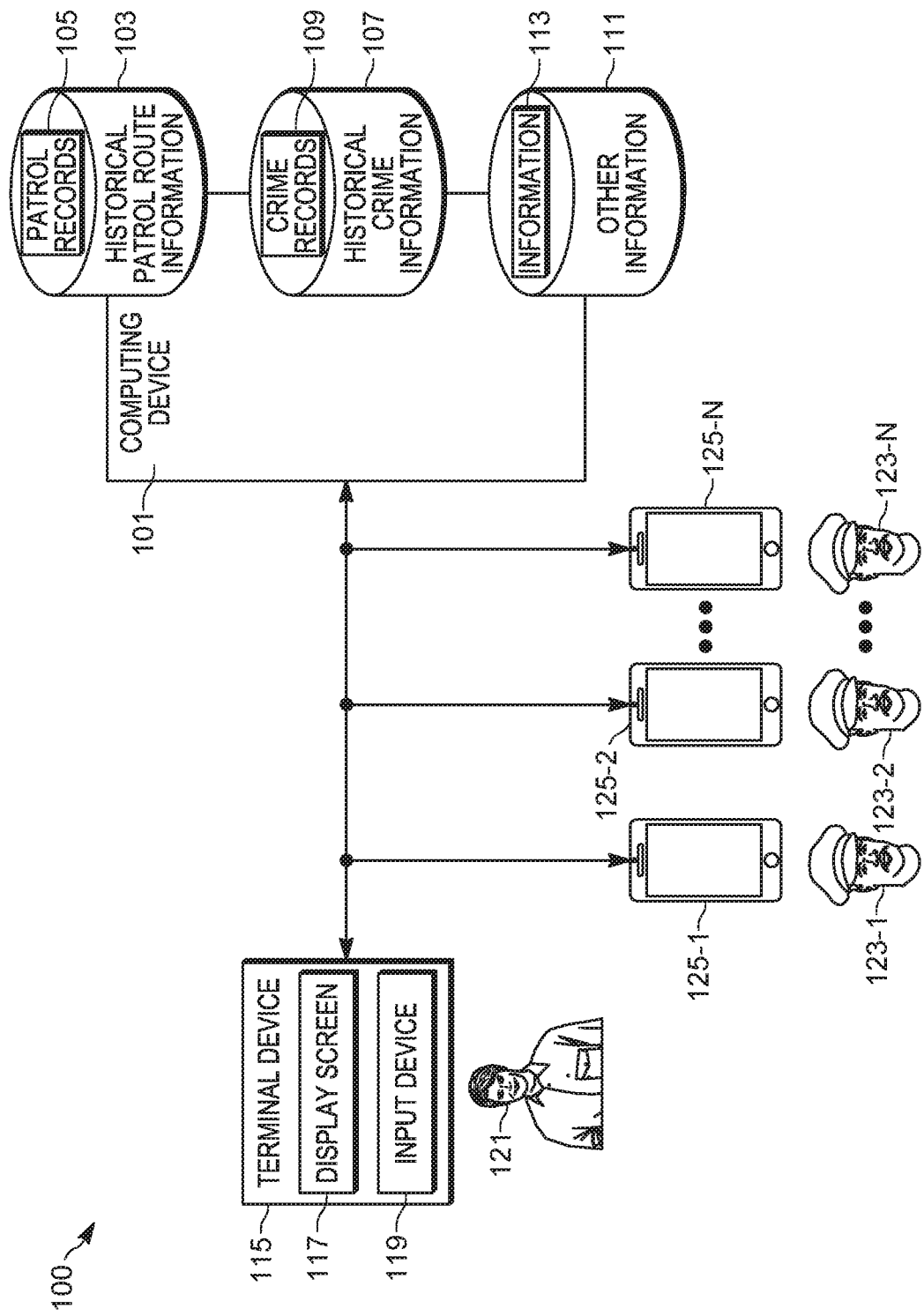
FIG. 1 is a system for dispatching responders to patrol routes, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Dispatching responders (e.g. police officers, security officers, etc.) to patrol routes is often manually performed by a dispatcher. The dispatcher may use considerable computer processing and/or communications resources in determining which responders to assign to which patrol routes. Furthermore, when the dispatcher fails to consider relevant electronically stored data and/or contextual factors as disclosed herein when dispatching responders, a crime rate along a patrol route may increase, which may lead to a considerable increase in consumption of technical computer processing resources and communications resources in dispatching more responders to coordinate a response to a crime and/or an incident.

An aspect of the specification provides a method comprising: accessing, at a computing device, historical patrol route information comprising records of patrol routes taken for each of a plurality of time periods, each of the patrol routes taken by a respective uniquely identified responder; accessing, at the computing device, historical crime information indicating actual crime rates for the patrol routes taken, for the plurality of time periods during which the respective uniquely identified responder was assigned to the patrol routes taken, as determined from the records; responsive to receiving, at the computing device, a request to assign respective uniquely identified responders to respective patrol routes, including the patrol routes taken, for an upcoming time period: determining, at the computing device, available respective uniquely identified responders for the upcoming time period; determining, at the computing device, based on the available respective uniquely identified responders and the historical crime information, a mapping of the available respective uniquely identified responders to the respective patrol routes that one or more of reduces and minimizes an expected crime rate for the upcoming time period across the respective patrol routes; and based on the determining of the mapping, causing, at the computing device, the available respective uniquely identified responders to be dispatched to the respective patrol routes for the upcoming time period.

Another aspect of the specification provides a computing device comprising: a communication unit; and a controller having access to one or more memories storing historical patrol route information and historical crime information, the controller configured to: access the historical patrol route information comprising records of patrol routes taken for each of a plurality of time periods, each of the patrol routes taken by a respective uniquely identified responder; access the historical crime information indicating actual crime rates for the patrol routes taken, for the plurality of time periods during which the respective uniquely identified responder was assigned to the patrol routes taken, as determined from the records; responsive to receiving a request to assign respective uniquely identified responders to respective patrol routes, including the patrol routes taken, for an upcoming time period: determine available respective uniquely identified responders for the upcoming time period; determine, based on the available respective uniquely identified responders and the historical crime information, a mapping of the available respective uniquely identified responders to the respective patrol routes that one or more of reduces and minimizes an expected crime rate for the upcoming time period across the respective patrol routes; and based on determining of the mapping, cause, using the communication unit, the available respective uniquely identified responders to be dispatched to the respective patrol routes for the upcoming time period Attention is directed to FIG. 1, which depicts an example system 100 for dispatching responders to patrol routes. Communication links between components of the system 100 are depicted in FIG. 1, and throughout the application, as double-ended arrows between respective components; the communication links may include any suitable combination of wireless and/or wired links and/or wireless and/or wired communication networks. The system 100 comprises a computing device 101 (interchangeably referred to hereafter as the device 101) that has access to historical patrol route information, for example as stored in a database 103, the historical patrol route information comprising records 105 of patrol routes taken for each of a plurality of time periods, each of the patrol routes taken by a respective uniquely identified responder identified in the records 105.

In some examples, the device 101 may further have access to one or more of a role and a function assigned to respective uniquely identified responders at the time of taking the patrol routes for each of the plurality of respective time periods, as also stored in the records 105.

The device 101 further has access to historical crime information, for example as stored in a database 107, indicating actual crime rates for the patrol routes taken, for the plurality of time periods during which the respective uniquely identified responder was assigned to (and/or was located at and determined via location tracking or via manual entry, as set forth elsewhere herein) the patrol routes taken, as determined from the records 105. For example, as depicted, the historical crime information may be stored as crime records 109 in the database 107.

In some examples, as depicted, the device 101 further has access to other types of information, for example as stored in at least one database 111 as records 113, including, but not limited to, one or more of historical environmental conditions, historical events, upcoming environmental conditions, and upcoming events at the respective patrol routes. Such historical events and/or upcoming events may include, but is not limited to, concerts, sporting events, and the like, and may also include social media posts and/or social media data which may be indicative of events. Such historical environmental conditions and/or upcoming environmental conditions may include, but is not limited to, historical weather conditions, upcoming weather forecasts, and/or any other types of environmental conditions, including, but not limited, to historical traffic patterns and the like.

The at least one database 111 may further include, but is not limited to, an employee database, for example of employees and/or responders of a public-services entity operating the system 100.

However, the at least one database 111 may further include one or more publicly accessible databases including, but not limited to, weather databases (e.g. storing historical environmental conditions and/or predicted upcoming environmental conditions), event databases, and the like. Hence, the at least one database 111 may comprise databases that are not accessible by the general public (e.g. the at least one database 111 may comprise one or more databases 111 that are maintained by a public-services entity operating the system 100) and/or at least one database 111 may comprise databases that are accessible by the general public (e.g. generally accessible weather databases).

While a particular database structure for storing the records 105, 109 (and optionally the records 113) are depicted in FIG. 1, the information of the records 105, 109, 113 may be stored according to any suitable structure and/or in any suitable manner including, but not limited to, storing the information in one or more databases and/or one or more memories (e.g. that may or may not include databases). Furthermore, the depicted databases 103, 107, 111 may be separate and/or at least partially combined, and/or the depicted databases 103, 107, 111 may be at least partially stored at a memory of the device 101 and/or be at least partially stored separate from the device 101 (e.g. and in communication with the device 101 via one or more communication links). Furthermore, information is described herein as being stored in "records", the term "record" is not intended to identify a particular type of storage format and such information may include any suitable format for storing information in a database and/or a memory, and the like.

As depicted, the device 101 is in communication with a terminal device 115 comprising a display screen 117 and an input device 119, the terminal device 115 may be operated by a dispatcher 121 interacting with the display screen 117 and the input device 119. While the device 101 and the terminal device 115 are depicted as separate from one another, in other examples, the device 101 and the terminal device 115 may be at least partially combined. In yet further examples, the terminal device 115 and the dispatcher 121 are optional.

The terminal device 115 may be operated by the dispatcher 121 to dispatch a number "N" of a plurality of uniquely identified responders 123-1, 123-2 . . . 123-N, each of which is associated with a respective communication device 125-1, 125-2 . . . 125-N. Hereafter, the uniquely identified responders 123-1, 123-2 . . . 123-N are interchangeably referred to, collectively, as the responders 123 and, generically, as a responder 123; similarly, the communication devices 125-1, 125-2 . . . 125-N are interchangeably referred to, collectively, as the communication devices 125 and, generically, as a communication device 125. The communication devices 125 are generally in communication with the device 101 and/or the terminal device 115 via respective communication links. While the communication devices 125 are depicted as, for example, mobile communication devices (e.g. such as a mobile radio and/or a cellphone and the like), one or more of the communication devices 125 may comprise a vehicle communication device and/or a non-mobile communication device. When a communication device 125 comprises a non-mobile communication device, the non-mobile communication device may be used by a responder 123 to receive dispatch instructions to dispatch the responder 123 to a patrol route, but the non-mobile communication device is not carried by the responder 123 when patrolling the patrol route.

Each of the "N" number of responders 123 may be assigned to an upcoming time period (e.g. an upcoming day and/or an upcoming shift) and/or to patrol routes for the upcoming time period, and are to be dispatched via the device 101 and/or the dispatcher 121 interacting with the device 101 via the terminal device 115. Each of the responders 123 may also be initially assigned to a respective patrol route for the upcoming time period (e.g. which may change as described below).The number "N" of the responders 123 may depend on how many responders (e.g. of a police department) have been electronically assigned to the upcoming time period or may otherwise be electronically marked as available for the upcoming time period (e.g. in an employee database). As such, the "N" number of responders 123 may be a subset of a larger number of responders of a public services agency (e.g. a police department).

In particular, each of the responders 123 is uniquely identified in the system 100, for example via an employee number, a badge number, and the like, for example at an employee database (e.g. of the at least one database 111), and the like. As such a responder 123 may be interchangeably referred to as a uniquely identified responder 123.

For example, the records 105 of the historical patrol route information may indicate patrol routes (e.g. beats and/or paths and/or routes) taken by uniquely identified responders 123 for each of a plurality of time periods, including, but not limited to, previous days and/or previous shifts. The historical patrol route information may comprise identifiers of patrol routes stored in association with identifiers of responders 123 that patrolled the patrol routes for given time periods. The historical patrol route information may include, but is not limited to: received Global Positioning System (GPS) coordinates (and times that the GPS coordinates were determined) of the responders 123 when patrolling a patrol route (e.g. as determined via GPS devices carried by the responders 123 on patrol, such as a GPS device of a communication device 125); and/or an indication that a responder 123 patrolled a patrol route for a given time period (e.g. as determined from shift records and/or as self-reported and/or electronically entered by a responder 123); and/or a list of streets, and the like, patrolled a by a responder 123 for a given time period, for example as self-reported and/or electronically entered by a responder 123 in a shift report; and the like. Furthermore, patrol routes of the historical patrol route information may at least partially overlap and/or at least partially coincide. The patrol routes may comprise streets, paths (e.g. of parks), and/or any route patrolled by responders 123.

In some examples, the historical patrol route information may further indicate an electronically stored role and/or a function of the responders 123 while patrolling a patrol route; for example, the historical patrol route information may indicate a mode of transportation of a responder 123 to indicate a role and/or function including, but not limited to, whether a responder 123 was in a vehicle (e.g. as a passenger or a driver), on foot, on a bicycle, on a horse and the like. A function of the responder 123 may be indicated via a rank and/or whether a responder 123 had a senior or junior function, and the like, for example when patrolling in pairs and/or groups.

The records 109 of the historical crime information generally includes historical crime information indicating actual crime rates and/or incidents for the patrol routes taken, for the plurality of time periods during which the respective uniquely identified responders 123 were assigned to the patrol routes taken. However, the records 105, 109 may also include records for responders other than the "N" number of responders 123 assigned to or marked as available for the upcoming time period and/or other patrol routes other than the patrol routes subject to assignment for the upcoming time period.

The historical crime information may be determined from digital crime and/or incident reports, and the like, uploaded to the database 107 which include locations of crimes and/or incidents, which may be used to locate the crimes and/or incidents on patrol routes. The historical crime information stored in the database 107 may further include, but is not limited to: types of crimes; severity of the crimes (e.g. weighted on a numerical scale); a total historical crime rating score and/or weighted crime rating score for a patrol route and/or time period (e.g., numbers of crimes multiplied by each crime type weight to give a total historical crime rating score); and/or a crime rate for a patrol route and/or time period (e.g. # of crimes per unit time (e.g. hours, days, weeks)); and the like.

For example, using a scale of 1 (least severe) to 10 (most severe), minor crimes such as jaywalking may be weighted as "1", certain intermediate crimes such as muggings may be weighted as "6" (and other a rating from "2" to "9", and severe crimes, such as murders, may be weighted as "10". A number of each type of crime along a given patrol route for a given time period may be multiplied by a respective weighting to yield a total crime rating score; the total crime rating score may be divided by the time period to yield weighted crime per time period. Hence, for example, when a given patrol route over an 8-hour shift included 2 instances of jaywalking (e.g. each having a score of "1"), 1 murder (e.g. having a score of "10"), and 2 muggings (e.g. each having a score of "6"), the total historical weighted crime rating may be determined as $(2 \times 1) \times (2 \times 6) + (1 \times 10) = 24$, or 3 crimes per hour (e.g. 24 crimes divided by 8 hours). Such a crime rate may alternatively be referred to as an expected crime rate score, and may be correlated with a particular uniquely identified responder 123 that patrolled the patrol route during this time period as indicated by the records 105 and used to determine an expected crime rate for the patrol route when the same particular uniquely identified responder 123 is assigned to that patrol route. Herein, the terms predicted crime rate and expected crime rate may be used interchangeably; similarly, herein the terms predicted crime rate score and expected crime rate score may be used interchangeably.

Such an expected crime rate may be further correlated with a mode of transportation of the particular uniquely identified responder 123 and/or a role of the particular uniquely identified responder 123 and/or a function of the particular uniquely identified responder 123, for example based on the mode of transportation and/or role and/or function of the particular uniquely identified responder 123 when the of the particular uniquely identified responder 123 patrolled the given patrol route.

In yet further examples, an expected crime rate may be further correlated and/or adjusted based on historical events and/or environmental conditions.

In yet further examples, an expected crime rate may not be stored at the database 107, but determined during implementation of a method for dispatching responders to patrol routes by the device 101, as described below with respect to FIG. 3.

Alternatively, other types of metrics may be used to determine an expected crime rate. For example, an average of a number of the crimes during a plurality of time periods for the given patrol route may be determined (e.g. a plurality of time periods when the particular uniquely identified responder 123 was patrolling the given patrol route) and/or an average of a number of expected crime rate scores determined for a plurality of time periods for the given patrol route may be determined (e.g. a plurality of time periods when the particular uniquely identified responder 123 was patrolling the given patrol route).

Hence, as described in more detail below, the device 101 may: access the historical patrol route information of the records 105 to determine patrol routes previously taken by the uniquely identified responders 123; cross-reference the historical patrol route information for the uniquely identified responders 123 with the historical crime information of the records 109; and determine historical crime information along particular patrol routes for time periods when a particular uniquely identified responder 123 patrolled the particular patrol routes. Hence, the impact and/or effect that a uniquely identified responder 123 has had on an historical crime rate on a particular patrol route may be embodied in the per-route/per-officer (and/or per-time-period) cross-referencing and matching of historical patrol route information and historical crime information, and then used to determine which combination of responders 123 and patrol routes reduces or minimizes an expected crime rate for the upcoming time period, consistent with the following disclosure.

Figure 2:
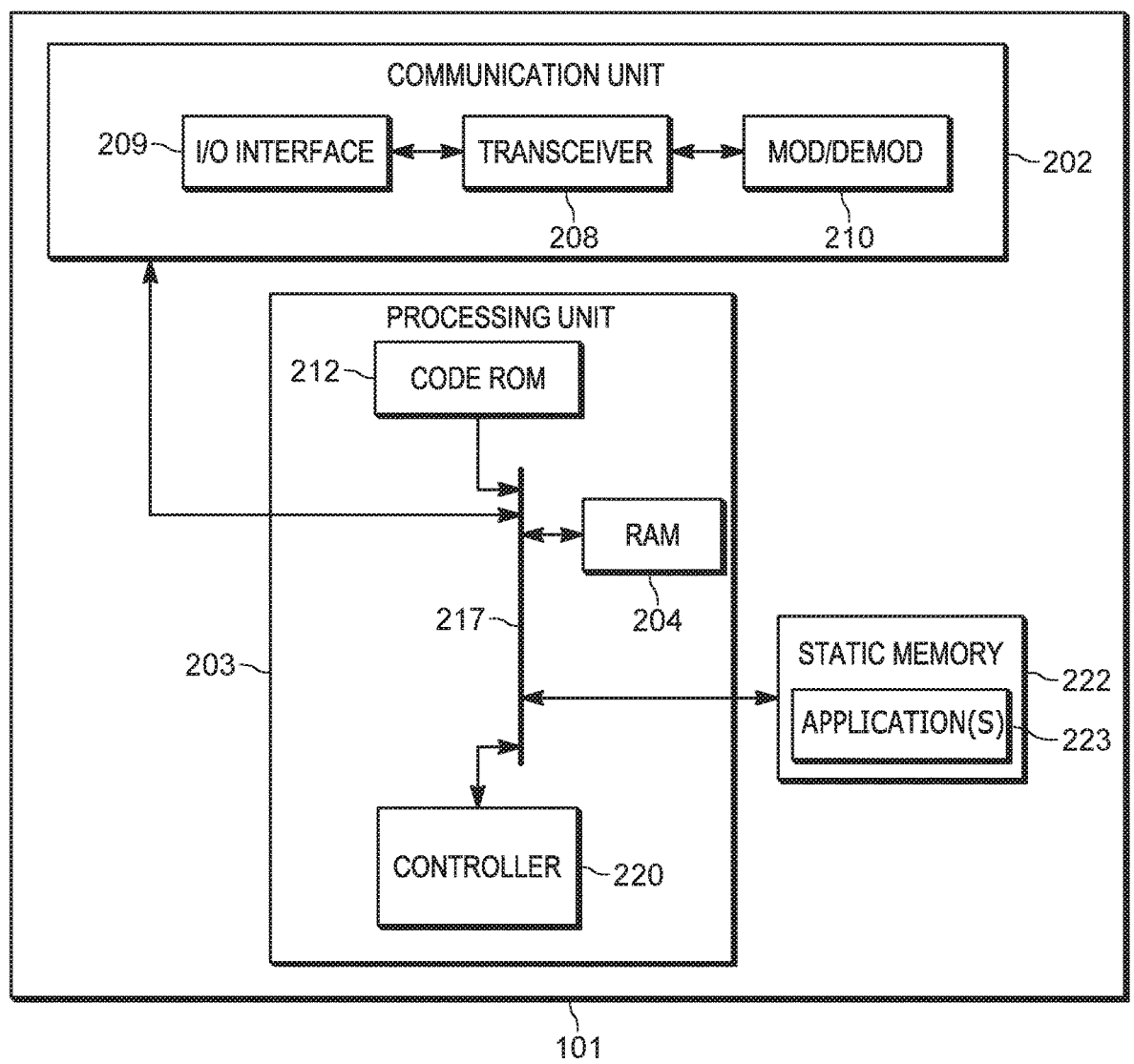
FIG. 2 is a device diagram showing a device structure of a device for dispatching responders to patrol routes, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the terminal device 115 and/or the communication devices 125. However, the device 101 may alternatively comprise the terminal device 115 and/or the device 101 may comprise a computing device such as a personal computer and/or a laptop computer, and the like.

As depicted, the device 101 comprises: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of at least one input device and a display screen and the like, such a user may interact with the device 101; however, in present examples the terminal device 115 is used to interact with the device 101.

As shown in FIG. 2, the device 101 includes the communications unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with the terminal device 115 and the communication devices 125. For example, the communication unit 202 may include one or more transceivers 208 and/or wireless transceivers for communicating with the terminal device 115 and the communication devices 125. Hence, the one or more transceivers 208 may be adapted for communication with one or more communication networks used to communicate with the terminal device 115 and the communication devices 125. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for dispatching responders to patrol routes. For example, in some examples, the device 101 and/or the controller 220 specifically comprises a computer executable engine configured to implement functionality for dispatching responders to patrol routes.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

Figure 3:
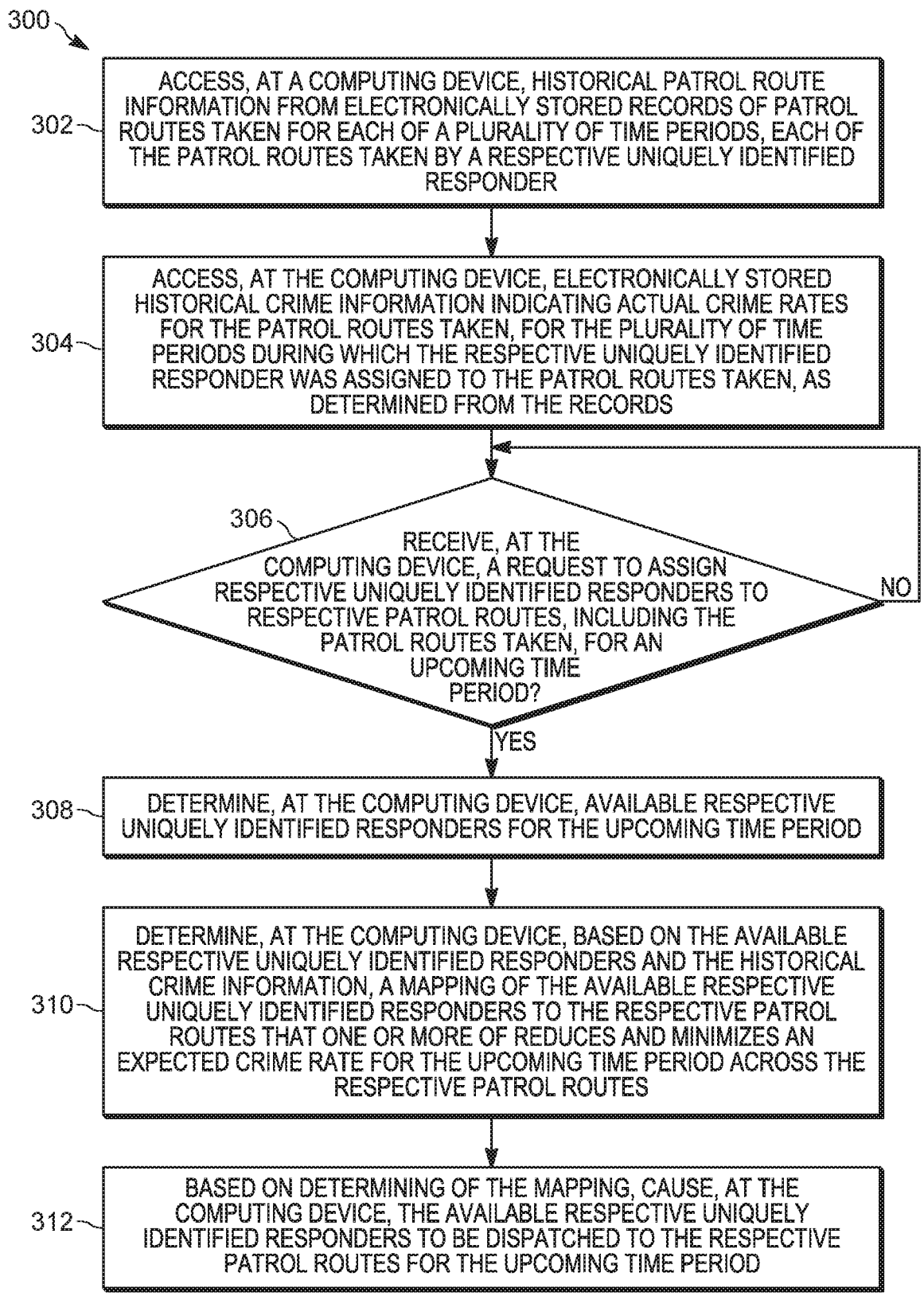
FIG. 3 is a flowchart of a method for dispatching responders to patrol routes, in accordance with some examples.

In particular, the memory 222 stores instructions corresponding to the at least one application 223 that, when executed by the controller 220, enables the controller 220 to implement functionality for dispatching responders to patrol routes including, but not limited to, the blocks of the method set forth in FIG. 3. In illustrated examples, when the controller 220 executes the one or more applications 223, the controller 220 is enabled to: access historical patrol route information comprising records 105 of patrol routes taken for each of a plurality of time periods, each of the patrol routes taken by a respective uniquely identified responder 123; access historical crime information (e.g. records 109) indicating actual crime rates for the patrol routes taken, for the plurality of time periods during which the respective uniquely identified responder 123 was assigned to the patrol routes taken, as determined from the records 105; responsive to receiving a request to assign respective uniquely identified responders to respective patrol routes, including the patrol routes taken, for an upcoming time period: determine available respective uniquely identified responders 123 for the upcoming time period; determine, based on the available respective uniquely identified responders 123 and the historical crime information, a mapping of the available respective uniquely identified responders 123 to the respective patrol routes that one or more of reduces and minimizes an expected crime rate for the upcoming time period across the respective patrol routes; and based on determining of the mapping, cause the available respective uniquely identified responders 123 to be dispatched to the respective patrol routes for the upcoming time period.

The application 223 may include numerical algorithms to determine expected crime rates of patrol routes using unique responder historical training data.

Alternatively, the application 223 may include machine learning and/or deep-learning based algorithms and/or neural networks, and the like, which have been trained to determine expected crime rates of patrol routes using unique responder historical training data. Furthermore, in these examples, the application 223 may initially be operated by the controller 220 in a training mode to train the machine learning and/or deep-learning based algorithms and/or neural networks of the application 223 to determine expected crime rates of patrol routes using unique responder historical training data using unique responder historical training data. The unique responder historical training data may comprise a subset of the historical crime information cross-referenced to the patrol routes taken the by responders 123 for various time periods.

The one or more machine learning algorithms and/or deep learning algorithms of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. However, any suitable machine learning algorithm and/or deep learning algorithm is within the scope of present examples.

While details of the terminal device 115 and the communication devices 125 are not depicted, each of the terminal device 115 and the communication devices 125 may have components similar to the device 101 adapted, however, for the respective functionality of the terminal device 115 and the communication devices 125.

Attention is now directed to FIG. 3 which depicts a flowchart representative of a method 300 for electronically dispatching responders to patrol routes. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 accesses historical patrol route information from electronically stored records 105 of patrol routes taken for each of a plurality of time periods, each of the patrol routes taken by a respective uniquely identified responder 123. For example, the controller 220 and/or the device 101 may access the database 103 to determine which patrol routes were previously patrolled by respective uniquely identified responder 123 assigned to an upcoming time period and/or shift.

At a block 304, the controller 220 and/or the device 101 accesses electronically stored historical crime information (e.g. crime and/or incident records 109) indicating actual crime rates for the patrol routes taken, for the plurality of time periods during which the respective uniquely identified responder 123 was assigned to the patrol routes taken, as determined from the records 105. For example, the controller 220 and/or the device 101 may access the database 107 to determine the historical crime information for the patrol routes indicated by the records 105 accessed at the block 302.

As described above, accessing the historical patrol route information and the historical crime information may comprise accessing one or more databases storing the historical patrol route information and the historical crime information. However, accessing the historical patrol route information and the historical crime information may comprise accessing one or more memories that store the historical patrol route information and the historical crime information.

At a block 306, the controller 220 and/or the device 101 determines whether a request to assign respective uniquely identified responders to respective patrol routes, including the patrol routes taken, for an upcoming time period has been received.

For example, such a request may be received from the terminal device 115 and/or any other suitable device used to communicate with the device 101. Such a request may be generated by the dispatcher 121, and the like, interacting with the input device 119 of the terminal device 115 to determine which responders 123 are to be assigned to patrol routes for a shift, and the like. However, the request may also be an automated request that is generated prior to the upcoming time period.

Returning briefly to block 302, the plurality of time periods may respectively comprise one or more of a day and a shift. Similarly, the upcoming time period of the block 306 may comprise one or more of an upcoming day and an upcoming shift. For example, the plurality of time periods over which the historical patrol route information and the historical patrol route information is accessed may be time periods similar to the upcoming time period; hence, when the upcoming time period is an evening shift, the plurality of time periods over which the historical patrol route information and the historical patrol route information is accessed may also be evening shifts. However, the plurality of time periods over which the historical patrol route information and the historical patrol route information is accessed may be any suitable time periods.

When a request is not received (e.g. a "NO" decision at the block 306), the controller 220 and/or the device 101 may repeat the block 306 until a request is received, for example in a loop. While repeating the block 306, the controller 220 and/or the device 101 may perform other functions, for example, other functions associated with dispatching responders to patrol routes and/or updating/maintaining the databases 103, 107.

However, responsive to receiving a request (e.g. a "YES" decision at the block 306) to assign respective uniquely identified responders to respective patrol routes, including the patrol routes taken, for an upcoming time period, at a block 308 the controller 220 and/or the device 101 determines available respective uniquely identified responders 123 for the upcoming time period.

At the block 308, the controller 220 and/or the device 101 may identify the available respective uniquely identified responders 123 (e.g. from a larger group of responders) by one or more of: receiving an indication that one or more of the available respective uniquely identified responders 123 are assigned to the upcoming time period; and receiving, from an input device (e.g. from the input device 119 of the terminal device 115), a selection of one or more of the available respective uniquely identified responders 123. In yet further examples, the available respective uniquely identified responders 123 may be identified via the available respective uniquely identified responders 123 being electronically assigned to the upcoming time period and/or electronically marked as available for the upcoming time period (e.g. at an employee database). However, any suitable process of assigning and/or identifying the responders 123 is within the scope of the present specification.

Furthermore, the number of available respective uniquely identified responders 123 to be dispatched to the respective patrol routes may be larger or smaller than a respective number of the respective patrol routes.

At a block 310, the controller 220 and/or the device 101 determines, based on the available respective uniquely identified responders 123 and the historical crime information, a mapping of the available respective uniquely identified responders 123 to the respective patrol routes that one or more of reduces or minimizes an expected crime rate (and/or reduces or minimizes an expected crime rate score) for the upcoming time period across the respective patrol routes.

For example, the mapping (described in further detail below) generally represents a combination of responders 123 and the respective patrol routes which attempts to one or more of reduce and minimize an expected crime rate (and the like) for the upcoming time period across the respective patrol routes when the responders 123 are dispatched to the respective patrol routes of the combination.

Hence, in some examples, determining the mapping of the available respective uniquely identified responders 123 to the respective patrol routes that one or more of reduces and minimizes an expected crime rate comprises: determining respective expected crime rate scores, as described above, for combinations of the available respective uniquely identified responders 123 and the respective patrol routes, based on the historical crime information; and selecting the mapping from the combinations, the mapping comprising a combination having a lowest expected crime rate score.

For example, when determining respective expected crime rate scores for combinations of the available respective uniquely identified responders 123 and the respective patrol routes, the controller 220 and/or the device 101 may use the historical crime information to predict how many crimes may be committed on a respective patrol route when a given responder 123 is assigned thereto, for example using weightings as described above. In other examples, the controller 220 and/or the device 101 may determine an average of a number of crimes and/or incidents (which may be weighted by crime type and/or incident type) that occurred on the respective patrol route when the given responder 123 was previously assigned to the respective patrol route, as described above. From these values, an expected crime rate score may be determined for a pairing of the respective patrol route with the given responder 123, as also described above. The controller 220 and/or the device 101 may determine an expected crime rate score for various pairings of the respective patrol routes and the responders 123 and determine a total expected crime rate score for different combinations of the respective patrol routes and the responders 123 for the upcoming time period. The combination of the respective patrol routes and the responders 123 which a lowest expected crime rate score may be then used as the determined mapping at block 310.

In further examples, the mapping may comprise a combination having a geographically-weighted expected crime rate score, and the like, and/or a geographically-weighted expected crime rate score may be used to determine alternative mappings to the mapping at the block 310 which may be provided at the display screen 117 for manual selection by the dispatcher 121. In some of these examples, when there are fewer responders 123 available than there are respective patrol routes, the controller 220 and/or the device 101 may select a combination for the mapping of the block 310 that does not have an overall lowest expected crime rate score, but the respective patrol routes of the selected combination may cover a larger geographic area than the mapping having one or more of the lowest expected crime rate score. Such a determination may be triggered manually (e.g. by the dispatcher 121) via a graphic user interface provided at the display screen 117. Alternatively, such a determination may be triggered automatically when there are fewer responders 123 available than there are respective patrol routes. In some examples the mapping determined at the block 310 may comprise a combination having a geographically-weighted expected crime rate score and may be automatically selected when the larger geographic area covers a geographic area that is a given threshold size larger than the mapping having one or more of the lowest expected crime rate score; in some of these examples, the threshold size may be in a range of one or more of: 0-10% larger, 0-20% larger, 0-50% larger, 0-100% larger, and the like. Indeed, an upper limit on the range and/or a given threshold size may be determined by the dispatcher 121 and/or an administrator of the system 100 and/or stored at the device 101.

In yet further examples, an expected crime rate score may be weighted and/or determined based on geographic square footage (and the like) of the geographic area covered by the given patrol route; for example, a given crime per square foot may be determined and used as a weighted expected crime rate score used in determining the mapping of the block 310.

In yet further examples, other types of weightings may be used including, but not limited to, size of residential areas covered, size of industrial areas covered and the like.

Regardless, in these examples, the controller 220 and/or the device 101 may be configured to dispatch the responders 123 to a subset of the patrol routes, the subset of the respective patrol routes selected to weight patrolling of a larger geographic area higher than patrolling a smaller geographic area patrol route. Alternatively, the controller 220 and/or the device 101 may be configured to dispatch the responders 123 to a subset of the patrol routes, the subset of the respective patrol routes selected to weight patrolling of a larger geographic area higher than patrolling a smaller geographic area patrol route when the larger geographic is a given threshold size larger than the smaller geographic area (e.g. in a range of 0-10% larger, and/or any other suitable range).

In other examples, where there are fewer responders 123 available than there are respective patrol routes, the controller 220 and/or the device 101 may select the subset of the respective patrol routes such that an expected crime rate for the upcoming time period is one or more of reduced and minimized across the respective patrol routes; put another way, the controller 220 and/or the device 101 may select the subset of the respective patrol routes, and assign responders 123 to be dispatched thereto in a manner that has the greatest impact on reducing and/or minimizing the expected crime rate across the geographic area of the respective patrol routes.

In yet further examples, there may be more responders 123 available than there are respective patrol routes, and the controller 220 and/or the device 101 may select more than one responder 123 to be dispatched to a respective patrol route to one or more of reduce and minimize an expected crime rate for the upcoming time period across the respective patrol routes. For example, the controller 220 and/or the device 101 may determine (e.g. from the historical patrol route information and the historical crime information): when a given pair of available respective uniquely identified responders 123 previously took a given patrol route together, the crime rate on the given patrol route was lower than when other pairs of available respective uniquely identified responders 123 previously took the given patrol route and/or lower than when each responder 123 took the given patrol route alone.

Various other factors may be used to determine the mapping. For example, determining the mapping may be further based on one or more of historical environmental conditions, historical events, upcoming environmental conditions, and upcoming events at the respective patrol routes. Hence, for example, the controller 220 and/or the device 101 may determine the effect of weather, sporting events, and the like on the historical crime information and correspondingly predict the effect of upcoming environmental conditions, and upcoming events at the respective patrol routes on the expected crime rate when determining the mapping. Such a determination may occur via machine learning algorithms, and the like, and/or using numerical algorithms similar to those described above (e.g. to correlate crime rate along a given patrol route with a given event and/or environmental condition).

For example, the controller 220 and/or the device 101 may determine the historical effect on crime rate of, for example, rain, and the like, along a given patrol route (e.g. when a given responder 123 was taking the patrol route) and adjust the expected crime rate based on upcoming weather forecasts along the given patrol route. Similarly, the controller 220 and/or the device 101 may determine the historical effect on crime rate of, for example, sporting events and/or concert events, and the like, along a given patrol route (e.g. when a given responder 123 was taking the patrol route) and adjust the expected crime rate based on upcoming events along the given patrol route.

Similarly, the controller 220 and/or the device 101 may determine the historical effect on crime rate correlated with one or more of a role and a function of a given responder 123 when a given responder 123 was taking the patrol route using machine learning algorithms and/or numerical algorithms. For example, in one shift and/or time period a given responder 123 may have been patrolling using a vehicle, while in another shift and/or time period, the given responder 123 may have been patrolling using a bicycle. The effect of the role (e.g. mode of transportation, and the like) on the crime rate and/or expected crime rate scores may be determined accordingly. Put another way, the expected crime rate may be adjusted by changing one or more of a role and a function of a given responder 123 to determine the effect on expected crime rate.

Regardless of the factors, the determining of the mapping may occur using one or more of a machine learning algorithm and a neural network, and the like, trained to predict crime rates of the patrol routes using unique responder historical training data, as described above. However, the determining of the mapping may occur using other applications that are not a machine learning algorithm and/or a neural network, for example the numerically determined crime rate scores described above.

At a block 312, the controller 220 and/or the device 101, based on determining of the mapping, causes the available respective uniquely identified responders 123 to be dispatched to the respective patrol routes for the upcoming time period.

Causing the available respective uniquely identified responders 123 to be dispatched to the respective patrol routes for the upcoming time period may occur in any suitable manner, and according to any suitable schedule. For example, the dispatching may occur prior to the upcoming time period (e.g. when determining a shift schedule well in advance of the upcoming time period) and/or at the beginning of the upcoming time period (e.g. when a shift starts). Furthermore, the dispatching may occur least partially automatically and/or at least partially manually.

For example, causing the available respective uniquely identified responders 123 to be dispatched to the respective patrol routes may comprise: in response to determining the mapping, transmitting respective dispatch instructions to respective communication devices 125 of the available respective uniquely identified responders 123. Transmitting the dispatch instructions may occur automatically at the device 101 and/or when a command to transmit the dispatch instructions is received at the device 101 from the terminal device 115. The dispatch instructions may include, but are not limited to one or more of: an identification of an assigned patrol route and the associated assigned responder; a direction to progress through the assigned patrol route and/or an illustrated/highlighted map of the assigned patrol route; computer executable instructions that may cause an unmanned vehicle associated with the assigned responder to pre-load or start executing the instructions to patrol the assigned patrol route; a request that the associated assigned responder provide an acknowledgment of receipt, and/or provide a positive acceptance of the assignment to patrol the assigned patrol route; and the like.

In some examples, the causing the available respective uniquely identified responders 123 to be dispatched to the respective patrol routes may comprise: controlling a display screen, such as the display screen 117, to render the mapping; receiving, from an input device, such as the input device 119, instructions to dispatch the available respective uniquely identified responders 123 to the respective patrol routes according to the mapping; and, in response, transmitting respective dispatch instructions to respective communication devices 125 of the available respective uniquely identified responders 123. Hence in these examples, the controller 220 and/or the device 101 may transmit the mapping to the terminal for rendering by the display screen 117 such that the dispatcher 121 may review the mapping; the dispatcher 121 may then operate the input device 119 to transmit a command to the device 101 to cause the device 101 to transmit instructions to dispatch the available respective uniquely identified responders 123 to the respective patrol routes according to the mapping. The device 101 may responsively transmit the dispatch instructions to the communication devices 125.

In some of these examples, the respective dispatch instructions may include an indication of reasons for an available respective uniquely identified responder 123 being dispatched to a respective patrol route, the reasons determined during the determining of the mapping at the block 310. For example, the indication of reasons may include, but is not limited to a textual and/or graphical indication of the effect of assigning combinations of different responders to different patrol routes which may include a predicted reason for the combinations. An example of such an indication of reasons is described below with reference to FIG. 5.

In yet further examples, when the effect of one or more of a role and a function of one or more of the available respective uniquely identified responders 123 on the expected crime rate occurs, the causing the available respective uniquely identified responders 123 to be dispatched for the upcoming time period comprises: changing one or more of a role and a function of one or more of the available respective uniquely identified responders 123, when the changing (i.e. of the one or more of the role the function of one or more of the available respective uniquely identified responders 123) one or more of reduces and minimizes the expected crime rate. Hence, for example, a given responder 123 may initially be assigned to a foot patrol; however, during the determining of the mapping, the controller 220 and/or the device 101 may determine that, when the given responder 123 is on a vehicle patrol, the expected crime rate may be reduces or minimizes, and the like, on the given patrol route, and the role of the given responder 123 is changed accordingly. Such change may be indicated or otherwise provided to the given responder in the respective dispatch instructions.

Similarly, when one or more of the available respective uniquely identified responders 123 was initially assigned (e.g. manually) to a patrol route for a shift, implementation of the method 300 may cause the patrol route to which a responder 123 was initially assigned to change, and such change indicated or otherwise provided to the responder in the respective dispatch instructions.

In some examples, after the upcoming time period is completed, the actual crime rates on the patrol routes may be further determined and stored at the database 107; and furthermore, the patrol routes taken by each of the responders 123 during the upcoming time period may be stored at the database 103 (including, but not limited to, deviations from the assigned patrol routes of the mapping). Such data may be used in future implementations of the method 300. Hence, in some example, the method 300 may further comprise tracking an effect of the available respective uniquely identified responders 123 on respective crime rates on the respective patrol routes for the upcoming time period.

Figure 4:
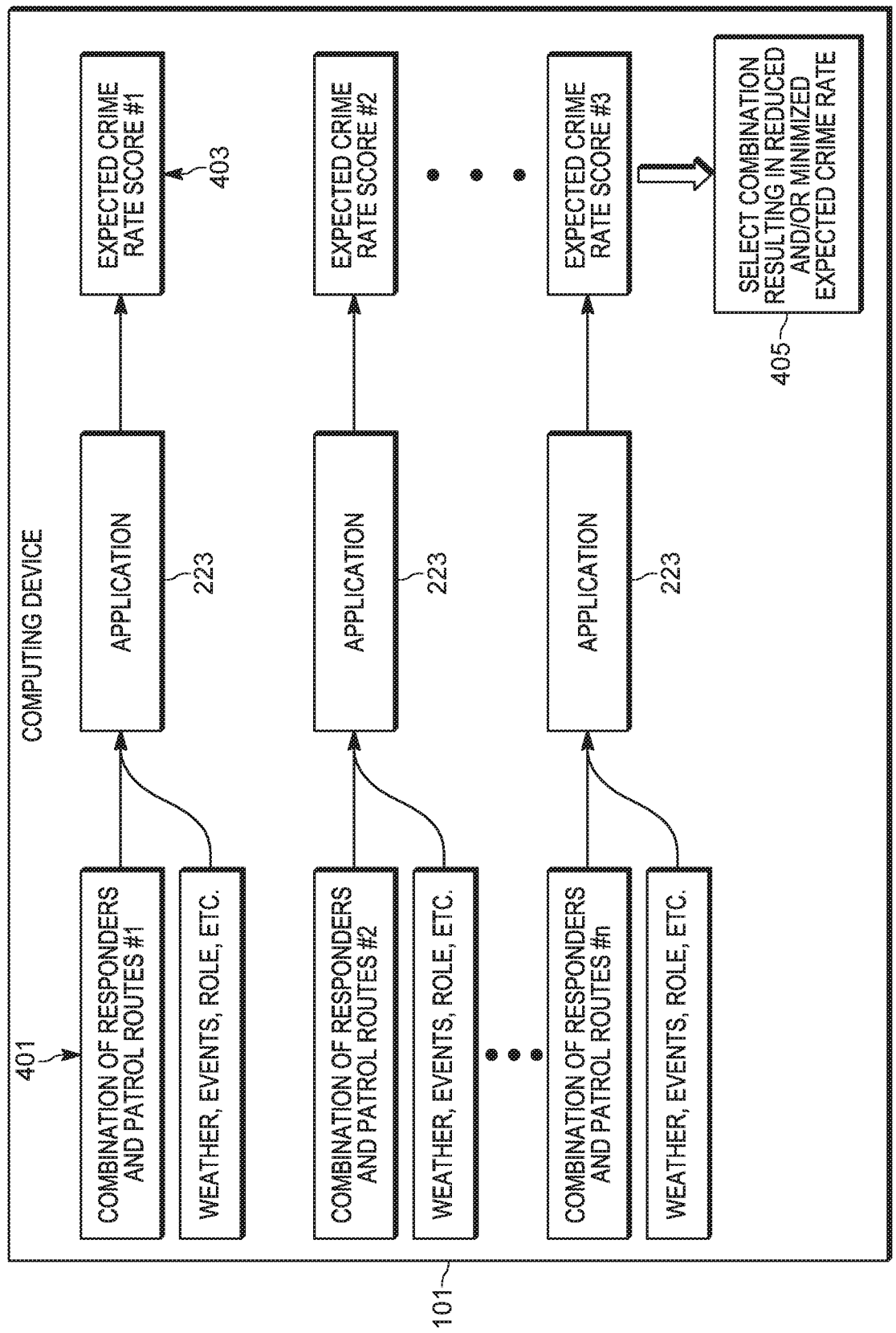
FIG. 4 is an example of a method for dispatching responders to patrol routes, in accordance with some examples.

Attention is next directed to FIG. 4 which depicts a specific example of the device 101 implementing the method 300. While specific components of the device 101 are not depicted in FIG. 4, such components, such as the controller 220, are understood to be present.

As depicted the device 101 is determining combinations 401 of responders 123 and patrol routes (e.g. each of the combinations 401 labelled "#1", "#2" . . . "#n"); for example, as depicted, the device 101 is determining a number "n" combinations of responders 123 and patrol routes. The number "n" may depend on the number "N" of responders and a number of patrol routes to be patrolled in the upcoming time period.

As depicted, the various "n" combinations of responders 123 and patrol routes are used as input to the application 223, for example, as depicted in FIG. 4 (which may include, but is not limited to, one or more "trained" machine learning algorithms, among other numerically based algorithms described above), which access the databases 103, 107 to determine historical patrol route information and historical crime information for each of the "n" combinations. For each of the "n" combinations, the algorithm 223 generates an expected crime rate score 403. For example, as depicted, for the "n" combinations, "n" expected crime rate scores 403 are determined.

As depicted, other data, such as weather, events, role of responders 123, may also be used as input to the application 223 to determine the expected crime rate scores and/or expected crime rate scores 403.

The device 101 may select 405, as the mapping of the block 310 of the method 300, the combination which results in the lowest and/or reduced and/or minimized expected crime rate score 403. Put another way, the lowest crime rate and/or lowest expected crime rate score 403 of the "n" scores is selected and the corresponding combination of the responders 123 and the patrol routes is selected as the mapping of the block 310 of the method 300.

Figure 5:
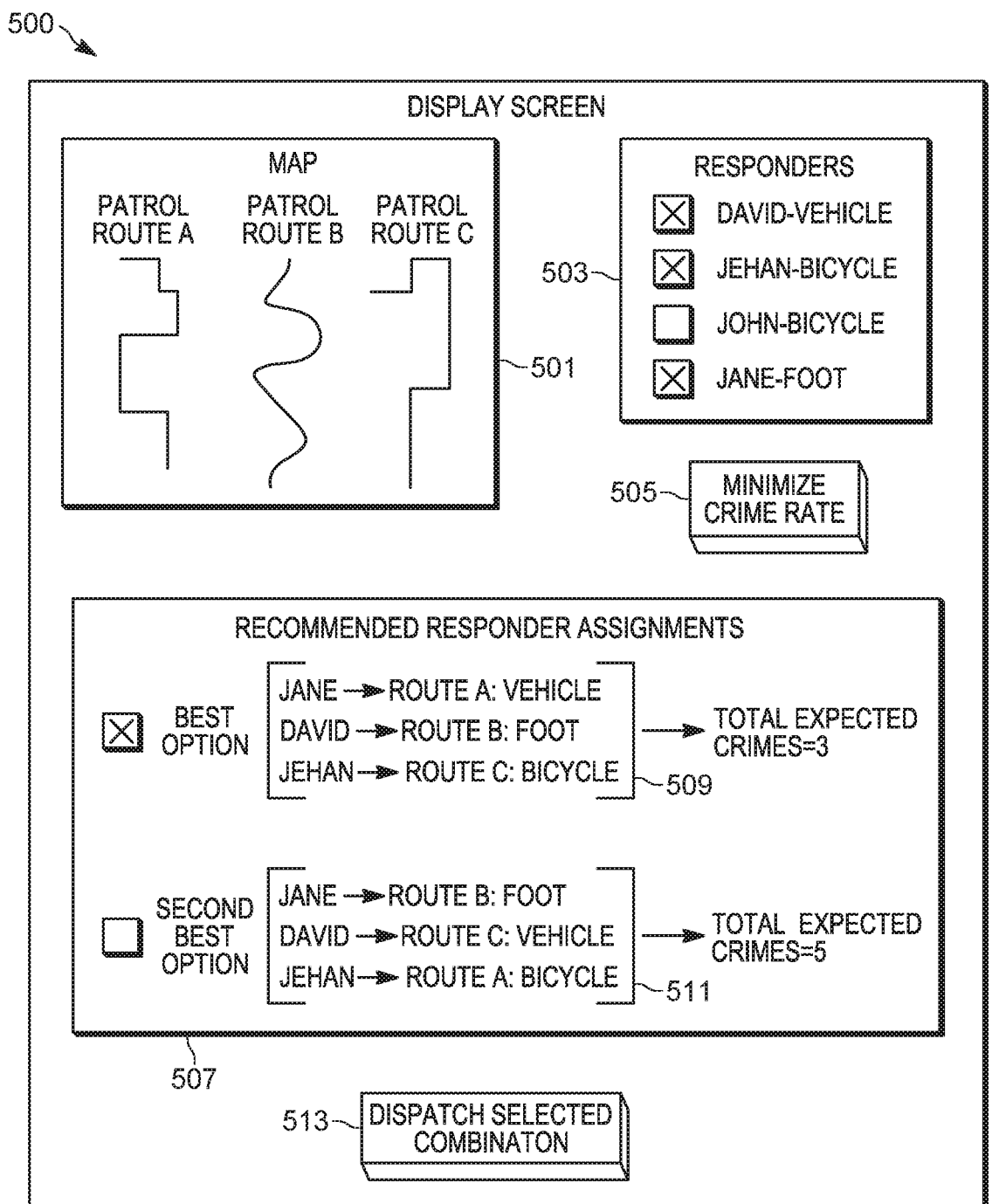
FIG. 5 is a graphical user interface which may be used to assist a device implementing a method for dispatching responders to patrol routes, in accordance with some examples.

Attention is next directed to FIG. 5 which depicts an example graphic user interface (GUI) 500 that may be provided at the display screen 117 of the terminal device 115 when the device 101 is implementing the method 300. As depicted the GUI 500 comprises a map 501 showing patrol routes ("A", "B", and "C") to which responders 123 are to be assigned for an upcoming time period, such as a shift, and the like.

The GUI 500 further comprises a list 503 of the available uniquely identified responders 123 along with a respective checkbox for each of the available responders 123 on the list 503, which may be used to select and/or identify the available uniquely identified responders 123 to be dispatched for the upcoming shift, for example using the input device 119. As depicted, the uniquely identified responders 123 named "David", "Jehan" and "Jane" are selected (for example in any suitable manner as described above and/or via manual input/selection, and the like), and the uniquely identified responder 123 named "John" is not selected and/or has been deselected (e.g. John may be assigned to a shift but has called in sick). Furthermore, uniquely identified responders 123 are listed in association with their respective roles; for example, "David" may generally be assigned to drive a "Vehicle", "Jehan" and "John" may be members of a "Bicycle" patrol unit, and "Jane" may generally be assigned to a "Foot" patrol. While not depicted, in other examples, the uniquely identified responders 123 may be listed in association with initially assigned patrol routes (e.g. assigned manually and/or by a default stored mapping).

The GUI 500 further comprises a soft button 505 which, when actuated (e.g. vie the input device 119) causes a request to be transmitted to the device 101, the request to assign respective uniquely identified responders 123 to the respective patrol routes as shown on the map 501.

In response to the soft button 505 being activated, and the device 101 receiving the request (e.g. at the block 306 of the method 300), the device 101 determines (e.g. at the block 310) a mapping of the available respective uniquely identified responders 123 to the respective patrol routes that one or more of reduces and minimizes an expected crime rate for the upcoming time period (e.g. shift) across the respective patrol routes. As depicted, the device 101 has returned the mapping and an associated expected crime rate to the terminal device 115, as well as other combinations of the available respective uniquely identified responders 123 to the respective patrol routes and an associated expected crime rates. In some examples, in response to receiving the request (e.g. at the block 306 of the method 300), the device 101 further determines (e.g. at the block 308) the available respective uniquely identified responders 123; for example, the available respective uniquely identified responders 123 may be transmitted as data in the request, and/or the device 101 may retrieve the list 503 from a database, and the like, in response to receiving the request.

As depicted, the GUI 500 further comprises a region 507 showing a mapping 509 of the available respective uniquely identified responders 123 to the respective patrol routes that minimizes an expected crime rate, along with a total number of the expected crimes. As depicted, the total number of expected crimes (e.g. "3") of the mapping 509 is understood to be the lowest number of expected crimes of the "n"

combinations. In these examples the number of expected crimes of the "n" combinations may represent a total of the expected crime rate scores of each of the "n" combinations. The total number of expected crimes may comprise the expected crime rate determined at the block 310 of the method 300, and/or an expected crime rate score 403 of FIG. 4. The mapping 509 is labelled as the "Best Option" for dispatching the available respective uniquely identified responders 123 to the respective patrol routes and further is adjacent a checkbox for selecting the "Best Option" (e.g. via the input device 119). As depicted the mapping 509 is selected.

As depicted, the mapping 509 further indicates a role of each of the responders 123 in the mapping. For example, as depicted, the mapping 509 includes the responder "Jane" suggested to be dispatched to a vehicle patrol on patrol route "A" thereby changing a role of "Jane" from "Foot" (e.g. as seen in the list 503) to "Vehicle". Similarly, the mapping 509 includes the responder "David" suggested to be dispatched to a foot patrol on patrol route "B" thereby changing a role of "David" from "Vehicle" (e.g. as seen in the list 503) to "Foot" to "Vehicle". As depicted, the region 507 further shows a combination 511 of the available respective uniquely identified responders 123 and the respective patrol routes that has the second lowest number of total expected crimes (e.g. of the "n" combinations), along with a total number of expected crimes (e.g. "5"), a "Second Best Option" label, and a respective checkbox for selecting the "Second Best Option" (e.g. via the input device 119). As depicted the combination 511 is not selected. However, roles of the responders 123 for the combination 511 are not changed as compared to the list 503. The combination 511 (e.g. "Second Best Option") is understood to be have a second lowest expected crime rate score of the "n" combinations, as compared to the mapping 509 (e.g. "Best Option), which is understood to be have a lowest expected crime rate score of the "n" combinations, as represented by the total number of expected crimes of each of the combination 511 (e.g. "5" expected crimes) and the mapping 509 (e.g. "3" expected crimes).

The dispatcher 121 may, however, prefer the combination 511 be used to dispatch the available respective uniquely identified responders 123, for example for reasons not considered by the device 101. Hence, the dispatcher 121 may select the combination 511 via the respective checkbox (which results in the checkbox for the mapping 509 being unchecked; in general, only one checkbox in the region 507 may be selected). For example, "David" may have an injury and may not be able to patrol route "B" on foot; as the combination 511 suggests that "David" patrol route "C" in a vehicle, the dispatcher 121 may prefer the combination 511 to the mapping 509 as "David" is injured.

The GUI 500 further comprises a soft button 513 which, when actuated (e.g. vie the input device 119) causes the responders 123 of the selected combination (e.g. the mapping 509) in the region 507 to be dispatched to the respective patrol routes. For example, in response to the soft button 513 being activated, the terminal device 115 may communicate with the device 101 to cause dispatch instructions to be transmitted to the communication devices 125 of the responders 123 of the mapping 509. The dispatch instructions may include the information depicted in the region 507 as an indication of reasons that an available respective uniquely identified responder 123 is being dispatched to a respective patrol route.

However, in other examples, the GUI 500 may comprise one soft button which, when actuated, cause the device 101 to both generate the mapping 509 and causes the dispatch instructions to be transmitted to the communication devices 125 of the responders 123 of the mapping 509. Alternatively, the soft button 505 may "in-place" transition to soft button 513 after activation of the soft button 505, among other possibilities.

In yet further examples, the GUI 500 may not be provided, however the determinations depicted in FIG. 4, and a mapping similar to that shown in FIG. 5 may be automatically generated by the device 101 periodically, and the device 101 may automatically transmit the dispatch instructions to the communication devices 125 of the responders 123 of a mapping in response to generating a mapping.

Hence, provided herein is a device, system and method for dispatching responders to patrol routes which may be a more efficient use of processing and/or network resources than when a dispatcher is dispatching responders by looking up responder records manually, and the like. Furthermore, the disclosed device, system and method may lead to a reduced crime rate along patrol routes which may later reduce use of technical resources due to a decrease in responders needed to respond to crime and/or incidents.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
   accessing, at a computing device, historical patrol route information comprising records of patrol routes taken for each of a plurality of time periods, each of the patrol routes taken by a respective uniquely identified responder;
   accessing, at the computing device, historical crime information indicating actual crime rates for the patrol routes taken, for the plurality of time periods during which the respective uniquely identified responder was assigned to the patrol routes taken, as determined from the records;
   responsive to receiving, at the computing device, a request to assign respective uniquely identified responders to respective patrol routes, including the patrol routes taken, for an upcoming time period:
     determining, by the computing device, available respective uniquely identified responders for the upcoming time period;
     determining, by the computing device, based on the available respective uniquely identified responders and the historical crime information, a mapping of the available respective uniquely identified responders to the respective patrol routes that one or more of reduces and minimizes an expected crime rate for the upcoming time period across the respective patrol routes; and
     based on the determining of the mapping, causing, by the computing device, the available respective uniquely identified responders to be dispatched to the respective patrol routes for the upcoming time period by; changing one or more of a role and a function of one or more of the available respective uniquely identified responders, when the changing one or more of reduces and minimizes the expected crime rate; and transmitting respective dispatch instructions to respective communication devices of the available respective uniquely identified responders via a communication network.

2. The method of claim 1, wherein the determining the mapping of the available respective uniquely identified responders to the respective patrol routes that one or more of reduces and minimizes an expected crime rate comprises:
   determining respective expected crime rate scores for combinations of the available respective uniquely identified responders and the respective patrol routes, based on the historical crime information; and
   selecting the mapping from the combinations, the mapping comprising a combination having a lowest expected crime rate score.

3. The method of claim 1, wherein the determining the mapping is further based on one or more of historical environmental conditions, historical events, upcoming environmental conditions, and upcoming events at the respective patrol routes.

4. The method of claim 1, wherein the transmitting the respective dispatch instructions to the respective communication devices of the available respective uniquely identified responders occurs in response to determining the mapping.

5. The method of claim 1,
   wherein the respective dispatch instructions include an indication of reasons for an available respective uniquely identified responder being dispatched to a respective patrol route, the reasons determined during the determining of the mapping.

6. The method of claim 1, wherein the causing the available respective uniquely identified responders to be dispatched to the respective patrol routes further comprises:
   controlling a display screen to render the mapping;
   receiving, from an input device, instructions to dispatch the available respective uniquely identified responders to the respective patrol routes according to the mapping; and, in response, transmitting the respective dispatch instructions to the respective communication devices of the available respective uniquely identified responders.

7. The method of claim 1, wherein the accessing the historical patrol route information and the historical crime information comprises accessing one or more databases storing the historical patrol route information and the historical crime information.

8. The method of claim 1, wherein: the plurality of time periods respectively comprises one or more of a day and a shift; and the upcoming time period comprises one or more of an upcoming day and an upcoming shift.

9. The method of claim 1, wherein the determining of the mapping occurs using one or more of a machine learning algorithm and a neural network trained to predict crime rates of the patrol routes using unique responder historical training data.

10. The method of claim 1, further comprising identifying the available respective uniquely identified responders by one or more of:
receiving an indication that one or more of the available respective uniquely identified responders are assigned to the upcoming time period; and
receiving, from an input device, a selection of one or more of the available respective uniquely identified responders.

11. The method of claim 1, further comprising tracking an effect of the available respective uniquely identified responders on respective crime rates on the respective patrol routes for the upcoming time period.

12. A computing device comprising:
a communication unit; and
a controller having access to one or more memories storing historical patrol route information and historical crime information, the controller configured to:
access the historical patrol route information comprising records of patrol routes taken for each of a plurality of time periods, each of the patrol routes taken by a respective uniquely identified responder;
access the historical crime information indicating actual crime rates for the patrol routes taken, for the plurality of time periods during which the respective uniquely identified responder was assigned to the patrol routes taken, as determined from the records;
responsive to receiving a request to assign respective uniquely identified responders to respective patrol routes, including the patrol routes taken, for an upcoming time period:
determine available respective uniquely identified responders for the upcoming time period;
determine, based on the available respective uniquely identified responders and the historical crime information, a mapping of the available respective uniquely identified responders to the respective patrol routes that one or more of reduces and minimizes an expected crime rate for the upcoming time period across the respective patrol routes; and
based on determining of the mapping, cause, using the communication unit, the available respective uniquely identified responders to be dispatched to the respective patrol routes for the upcoming time period by; changing one or more of a role and a function of one or more of the available respective uniquely identified responders, when the changing one or more of reduces and minimizes the expected crime rate; and transmitting respective dispatch instruction to respective communication devices of the available respective uniquely identified responders via a communication network.

13. The computing device of claim 12, wherein the controller is further configured to determine the mapping of the available respective uniquely identified responders to the respective patrol routes that one or more of reduces and minimizes an expected crime rate by:
determining respective expected crime rate scores for combinations of the available respective uniquely identified responders and the respective patrol routes, based on the historical crime information; and
selecting the mapping from the combinations, the mapping comprising a combination having a lowest expected crime rate score.

14. The computing device of claim 12, wherein the controller is further configured to determine the mapping further based on one or more of historical environmental conditions, historical events, upcoming environmental conditions, and upcoming events at the respective patrol routes.

15. The computing device of claim 12, wherein the transmitting, using the communication unit, respective dispatch instructions to respective communication devices of the available respective uniquely identified responders occurs in response to determining the mapping.

16. The computing device of claim 12,
wherein the respective dispatch instructions include an indication of reasons for an available respective uniquely identified responder being dispatched to a respective patrol route, the reasons determined during the determining of the mapping.

17. The computing device of claim 12, wherein the controller is further configured to cause the available respective uniquely identified responders to be dispatched to the respective patrol routes by:
controlling a display screen to render the mapping;
receiving, from an input device, instructions to dispatch the available respective uniquely identified responders to the respective patrol routes according to the mapping; and, in response,
transmitting the respective dispatch instructions to the respective communication devices of the available respective uniquely identified responders.

18. The computing device of claim 12, wherein the controller is further configured to: identify the available respective uniquely identified responders by one or more of:
receiving an indication that one or more of the available respective uniquely identified responders are assigned to the upcoming time period; and
receiving, from an input device, a selection of one or more of the available respective uniquely identified responders.

* * * * *